US007770004B2

(12) United States Patent
Herf et al.

(10) Patent No.: US 7,770,004 B2
(45) Date of Patent: Aug. 3, 2010

(54) METHODS AND SYSTEMS FOR IMAGE SHARING OVER A NETWORK

(75) Inventors: Michael Herf, Studio City, CA (US); Brian McBarron, Harrison City, PA (US)

(73) Assignee: Google Inc., Mountain View, CA (US)

( * ) Notice: Subject to any disclaimer, the term of this patent is extended or adjusted under 35 U.S.C. 154(b) by 1707 days.

(21) Appl. No.: 10/847,536

(22) Filed: May 17, 2004

(65) Prior Publication Data

US 2005/0052685 A1    Mar. 10, 2005

Related U.S. Application Data

(60) Provisional application No. 60/471,168, filed on May 16, 2003.

(51) Int. Cl.
H04L 29/06    (2006.01)
(52) U.S. Cl. .......................................... 713/162; 726/3
(58) Field of Classification Search .................. None
See application file for complete search history.

(56) References Cited

U.S. PATENT DOCUMENTS

| 5,991,816 | A  | * | 11/1999 | Percival et al. .............. 709/247 |
| 7,290,280 | B2 | * | 10/2007 | Yeager et al. ................. 726/14 |
| 7,474,795 | B2 | * | 1/2009  | Sirohey et al. ............... 382/240 |
| 2002/0126135 | A1 | | 9/2002 | Ball et al. |
| 2002/0143972 | A1 | | 10/2002 | Christopoulos et al. |
| 2003/0063770 | A1 | | 4/2003 | Svendsen et al. |
| 2003/0063771 | A1 | | 4/2003 | Morris et al. |
| 2003/0236830 | A1 | * | 12/2003 | Ortiz et al. .................. 709/204 |
| 2004/0109197 | A1 | * | 6/2004 | Gardaz et al. .............. 358/1.15 |
| 2004/0255137 | A1 | * | 12/2004 | Ying ......................... 713/193 |

OTHER PUBLICATIONS

Coulouris et al., "Distributed Systems—Concepts and Design", 2001, Addison-Wesley, 3rd Edition, pp. 130-133.*
"Instant Photo Sharing Software Offers a Fast, Easy and Safe Way to Distribute Digital Images", creativepro.com, Mar. 18, 2004.
Australian Office Action for Australian Patent Application No. 2004241582, dated Apr. 2, 2009, 2 pages.
Chinese Office Action for Chinese Patent Application No. 200480013424.6, dated Feb. 6, 2009, 9 pages.
Notification of Transmittal of the International Search Report and the Written Opinion of the International Searching Authority, or the Declaration for PCT/US04/15255 dated Nov. 14, 2005, 9 pages.
Chinese Office Action for Chinese Application No. 2004800134246, mailed Sep. 11, 2009, 4 pages.

* cited by examiner

Primary Examiner—Minh Dinh
(74) Attorney, Agent, or Firm—Blakely, Sokoloff, Taylor & Zafman LLP (57) ABSTRACT

Methods and systems are provided for sharing images over a network. A first user selects an image for sharing and designates an image recipient. Metadata for the first image is transmitted from the first user's terminal to the image recipient's terminal. At least partly in response to receiving the metadata, the image recipient's terminal transmits a request for the first image at a first resolution to the first user's terminal. In response to the request, the first user's terminal transmits the first image at the requested first resolution to the image recipient's terminal.

80 Claims, 7 Drawing Sheets

METHODS AND SYSTEMS FOR IMAGE SHARING OVER A NETWORK

PRIORITY CLAIM

This application claims the benefit under 35 U.S.C. 119(e) of U.S. Provisional Application No. 60/471,168, filed May 16, 2003, the contents of which are incorporated herein in their entirety.

Copyright Rights

A portion of the disclosure of this patent document contains material that is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

BACKGROUND OF THE INVENTION

1. Field of the Invention

The present invention is related to image transmission and retrieval, and in particular, to methods and systems for transmitting and retrieving digital images over a network.

2. Description of the Related Art

Many applications use network protocols to transfer digital media files from one computer over a network to another computer. By way of example, when users request images via the World Wide Web, HTTP protocol is conventionally used to transmit the requested images encoded as JPEG files to the users. This type of access is commonly referred to as a "pull" protocol because users request each image through the use of a Web browser.

Further, many conventional Web sites that provide views of image data require users to upload original pictures or other image files, which can total hundreds of megabits of transfer and hours of upload time, even if the pictures are never actually viewed by others.

Users also conventionally send digital pictures through email in order to "push" files to other users. Users can search for files on a number of peer-to-peer (or "p2p") networks to find image files to download and share with others. The foregoing methods are file-based, wherein the request mechanism asks for the contents of a file and those contents are transferred over a network. In particular, with respect to image files, these methods can sometimes require that the sender send images using a fixed image resolution, which is the file received by the recipient.

Further, emailing large, high resolution pictures can cause large download times for the recipients, can tie up their network access and their computer, and so sending many pictures this way is often considered rude. When small pictures are sent via email, the process is generally accomplished manually, by repeated emails and resizing operations to obtain the desired resolution, which is tedious, difficult, and time consuming for the average user.

Still other conventional methods necessitate that the sending server know the resolution and/or terminal type of the requesting terminal so that the sending server can select and transmit images at the appropriate resolution. However, this approach is often of little use where the sending server does not know the resolution and/or type of requesting terminal. Yet other conventional systems store several versions of each image at several different resolutions in order to accommodate different resolution requests. Such storage of multiple versions can significantly increase the needed available storage memory.

SUMMARY OF THE INVENTION

The present invention provides methods and systems for retrieving and transmitting digital images over a network. One embodiment enables users to automatically gain resolution-independent access to files remotely via a permissions model. Further, one embodiment enables a first user to transmit large numbers of image files to second user using a relatively small amount of bandwidth.

In one example embodiment, a sending user sends permission data regarding one or more images to a recipient user's terminal. The recipient user's terminal can use the permission data to request images at desired resolutions, such as thumbnail images of very low resolution, to thereby reduce the time it takes for the transmitting terminal to send the images over a network to the recipient terminal. The user can then select one or more of the thumbnails for which the user would like to receive a relatively higher resolution (if still low or medium resolution) image. The relatively higher resolution images can then be transmitted from the transmitting terminal to the recipient terminal. The recipient can select one or more of the low-resolution or relatively higher resolution images for which the recipient would like still higher resolution or zoomed versions. For example, the recipient can selectively request the highest available resolution file image for one or more images.

The resolution values of the delivered images are optionally determined, at least in part, by the recipient, and the requested resolution values do not have to be remembered or previously known by the transmitting terminal.

One example embodiment provides a method of peer-to-peer sharing of images over a network, the method comprising: receiving a selection of a first image by a user of a sending peer terminal, wherein the first image has a first resolution; transmitting over a network permission data for the selected first image from the sending peer terminal to a receiving peer terminal, the permission data including at least image identification information and resolution information, the resolution information specifying a second resolution less than the first resolution; automatically transmitting an image request for the first image from the receiving peer terminal to the sending peer terminal, wherein the image request is based at least in part on the permission data image identification information and resolution information; and in response to receiving the image request, the sending peer terminal scaling first image to the second resolution, encrypting the scaled first image, and transmitting over the network the encrypted first image at the second resolution to the receiving peer terminal.

Another example embodiment provides a peer-to-peer image sharing application for sharing images between users, the peer-to-peer image sharing application comprising instructions stored in computer readable memory configured to: receive a selection of a plurality of images by a first user of a first terminal; receive a send image command from the first user; cause a list of potential recipients to be displayed to the first user; receive a selection of at least a first recipient from the list of potential recipients from the first user; transmit permission data for the plurality of images to a terminal associated with the first recipient; receive a request from the terminal associated with the first recipient, the request identifying the plurality of images and a first requested resolution for the plurality of images; and transmit to the terminal associated with the first recipient the plurality of images at the first requested resolution so that they appear on a display of the terminal substantially instantly.

Still another example embodiment provides a peer-to-peer image sharing program for sharing images between users, the peer-to-peer image sharing application comprising instructions stored in computer readable memory configured to: receive at a first terminal permission data for an image stored on a sending user's terminal; at least partly in response to receiving the permission data, automatically transmit from the first terminal a request for the image to the sending user's terminal, the request specifying a first requested image resolution; receive at the first terminal the image at the first requested image resolution from the sending user's terminal; and cause the image to be displayed at the first requested image resolution on a first terminal display.

Yet another example embodiment provides a method of peer-to-peer sharing of images, the method comprising: receiving a selection of a first image by a first user of a first terminal; receiving a recipient selection by the first user; transmitting metadata for the first image from the first terminal to a second terminal associated with a second user; at least partly in response to receiving the metadata, the second terminal automatically transmitting a request for the first image at a first resolution to the first terminal; and in response to the request, the first terminal automatically transmitting the first image at the requested first resolution to the second terminal.

Another example embodiment provides a method of peer-to-peer sharing of images, the method comprising: receiving permission data for a first image from a first terminal, the permission data including an identifier for the first image; at least partly in response to receiving the permission data, automatically transmitting at least a first request for the first image at a first resolution to the first terminal, the at least first request including the first image identifier and user identification; receiving the first image at the requested first resolution; and automatically causing the first image to be displayed to a receiving user.

Still another example embodiment provides a method of sharing of images, the method comprising: receiving a selection of a first image by a user of a sending terminal, wherein the first image has a first resolution; transmitting permission data for the selected first image from the sending terminal to a receiving terminal, the permission data including at least image identification information; receiving at the sending terminal an image request from the receiving peer terminal, wherein the request is for the first image and is based at least in part on the identification information and specifies a second resolution lower than the first resolution; and scaling first image to the second resolution and transmitting the scaled first image to the receiving terminal in response to receiving the image request.

DETAILED DESCRIPTION OF PREFERRED EMBODIMENTS

Throughout the following description, the term "Web site" is used to refer to a user-accessible server site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well.

In addition, unless otherwise indicated, the functions described herein are preferably performed by software modules including executable code and instructions running on one or more general-purpose computers. The computers can include one or more central processing units (CPUs), that execute program code and process data, memory, including one or more of volatile memory, such as random access memory (RAM) for temporarily storing data and data structures during program execution, non-volatile memory, such as a hard disc drive, optical drive, or FLASH drive, for storing programs, data, and databases, and one or more network interfaces for accessing an intranet and/or Internet.

In addition, the computers can include a display for displaying user interfaces, data, photographs, images, and the like. The computers can also include one or more user input devices, such as a keyboard, mouse, pointing device, microphone and/or the like, used to navigate, provide commands, enter information, and/or the like. However, the present invention can also be implemented using special purpose computers, state machines, and/or hardwired electronic circuits. In addition, the example processes described herein do not necessarily have to be performed in the described sequence, and not all states have to be reached or performed.

Further, while the following description may refer to "clicking on" a link or button, or pressing a key in order to provide a command or make a selection, the commands or selections can also be made using other input techniques, such as using voice input, pen input, mousing or hovering over an input area, selecting menu options, and/or the like. In addition, while certain processes and functions may be described as being performed separately by a file sharing application and an image management application, the processes and functions can be performed by the same application.

The present invention provides methods and systems for sending and retrieving digital images over a network. As will be discussed in greater detail herein, an example embodiment enables users to selectively gain access to multiple resolution versions of image files over a network. In one embodiment, these resolution values are determined, at least in part, by the recipient or recipient terminal, which sends a request for images at the desired resolution to the transmitting system. Optionally, the request can be a single request for the images, or the request can be in the form of a separate request for each of the images, wherein the separate requests can be transmitted sequentially and can optionally be transmitted at the same or substantially the same time as permission data for additional images is being received. The transmitting system can optionally process and size the images to the requested resolution on the fly in response to the recipient's or the recipient's terminal request. Thus, prior to the recipient terminal's request, the transmitting system does not have to know which versions of the images will be requested or have to pre-store versions of the images at the requested resolutions.

For example, the recipient can select a picture resolution corresponding to a thumbnail. When the thumbnail image is displayed, the recipient can then click on the thumbnail and a higher resolution version of the picture is quickly downloaded from the sender's computer, wherein the picture resolution can be selected based on that desired for on-screen viewing of a 5 inch×3.5 inch version of the picture, 4 inch×7 inch version of the picture, a 5 inch ×7 inch version of the picture, an 8 inch by 10 inch version of the picture, a full screen version of the picture, and so on. Once the recipients have received the relatively higher resolution images, the recipient can then optionally selectively download still higher resolution or print quality copies of the pictures the user is interested in. The recipient can then print the still higher resolution or print quality pictures at home or the office using a color printer.

Optionally, the sharing applications automatically transfer both the thumbnail version of the images and the next highest resolution, such as the screen resolution, version of the images to the receiving terminal before the receiving user actually selects an image. Thus, in response to the receiving user clicking on a thumbnail version of an image, the screen version of the image is instantly presented as it is already stored on the receiving user's terminal. Optionally the transfer of the two versions of a given image is prioritized so that the transfer of the lower resolution, thumbnail version, of the image is given a higher priority than the relatively higher, screen resolution version of the image. In an example embodiment, where several images are to be transferred, the thumbnail versions are transferred first, and then the relatively higher resolution versions are automatically transferred from the sending terminal to the receiving terminal.

With respect to conventional picture sharing systems, because Web servers can be highly customizable, resolution-independent access to pictures (including zoomed subsections) has been conventionally implemented over HTTP and accessible via Web browsers. Many of these systems are based on tiled representations of an image (which the client can reconstruct into image data through browser plug-ins), but arbitrary-size requests have also been implemented previously. In practice, web sites that provide views of users' image data to others typically require users to upload original pictures in the form of image files, which can total hundreds of megabits of transfer and hours of upload time, even if the pictures are never actually viewed by others.

Further, using conventional techniques, emailing large pictures causes huge download times for the recipients, and sending many pictures this way is considered rude. When small pictures are sent via email, the process is accomplished manually, by repeated emails and resizing operations, which is tedious, difficult, and time consuming for the average user.

By contrast, one embodiment of the image sharing process provided herein can be referred to, for convenience, as a "hybrid push-pull model." A machine, such as a terminal (which can be a networked desktop computer, server, personal digital assistant, personal video recorder, cellular telephone, image server, or the like, which may be referred to for convenience as the "server" or "sender") makes available one or many files by transmitting permission data to a receiving peer (which can be a networked desktop computer, server, personal digital assistant, personal video recorder, cellular telephone, image server, or the like, which may be referred to for convenience as the "receiver" or the "recipient"). The receiving peer, remembering, retrieving and transmitting this permission data, or selected portions thereof, back to the sender, can repeatedly request versions of the image by specifying a size (expressed, by way of example, as a bounding box) that the remote sender responds to with image data.

Optionally, the receiver can request the binary contents of the original file, which is an operation supported by existing transfer protocols.

Using the "push" nature of the protocol described herein, a user does not have to know about an image resource before gaining access to it. Additionally, persistence of permission information may be provided on the client, so that the recipient maintains access to the file and versions thereof over an extended period and optionally over multiple resolution requests.

Thus, using an embodiment of the method described herein enables a user to share files, such as low resolution versions of image files, with another user using little or substantially no bandwidth. Further, the method described herein enables users to select the desired resolution version of the image. For example, a user may transmit permission for 100 files totaling 100MB of raw data. Thus, in contrast to conventional methods, which might, in this example, transfer the 100MB of raw data between the peers, the receiving terminal may request thumbnails totaling 200KB, "previews" (which can be for example, 1280×960 pixels) for a selection of images totaling 500KB, and original data for only 2 more files, totaling 2MB. In the example given, the network bandwidth used has been reduced by more than a factor of 30, as compared with the transfer of all the original, full resolution images, with no prior knowledge by the sender of how the images would be used.

For applications where access to the original files should be protected, such as online art sales, the file sharing application enables a user to specify the maximum size or resolution available to requesters. Optionally, different requesters can have access to different image sizes or resolution. For example, a print-resolution fine art work may be stored at a very high resolution, but may be limited by the sender to a size of 640×480 pixels with respect to transmission to recipients via the file sharing application. Optionally, the sender can specify that certain recipients, such as paying recipients or specified friends or coworkers, can access higher resolution or full resolution versions of the images.

To accomplish this, in an example embodiment, the sender file sharing application examines the file's actual size, the sender's maximum size or resolution to send, and the recipient's request size or resolution. Thus, the version of the image will be substantially equal to the smaller of the requested resolution and the maximum resolution or size specified by the sender. The sender file sharing application resizes the picture in question to this size using high-quality methods, such as bicubic resampling of the original image file, and then sends a compressed file, which is optionally encrypted, to the recipient. In one embodiment, the encryption is provided on a stream level. The encryption can be performed, by way of example, on a stream level, wherein the peer stream is itself encrypted and/or on a component level, wherein, for example, individual items and files are encrypted.

In one embodiment, the sender selects the pictures or images to be shared using an image management application. For convenience, in the following description the phrases "picture" or "pictures" includes pictures or images, such as pictures or images in a JPEG compliant format, as well as other types of images, such as bmp or gif images or graphic files. Optionally, the image management application can be integrated with the file sharing application. The image management application can display on a user terminal screen one or more pictures, or thumbnails or reduced sized versions of the pictures.

In an example embodiment, as pictures are selected thumbnails thereof are displayed and grouped in another area of the screen, such as at the bottom, top right side, or left side of the screen. Once the user has finished selecting all of the pictures the user wants to share in a given sharing session, the user can click on a file sharing button. The screen presented on the user's terminal will then switch to the file sharing application and a file sharing dialog box or menu is presented.

One or more names or identifiers are presented via a dialog box, menu, address book, or the like, that correspond to other users. The user can select picture recipients by clicking on one or more of the presented user names or identifiers and then clicking on a send button. Optionally, after the selected pictures have been sent, images thereof are placed or remain in a "recent pictures" tray or file for quick access by the sender so that they can be quickly accessed and sent by the sender to other users.

Optionally, the file sharing application protects against viruses by automatically confirming that picture files are valid picture-type files, such as a JPG or TIFF file, before allowing them to be shared. Thus, the file sharing application prevents the sharing and transmission of viruses.

In an example embodiment, the shared pictures can be pictures captured in real time or in substantially real time via a Web cam or other camera or image capture system coupled to the user terminal. For example, in one embodiment, the user can click on an image capture button which will cause a picture to be captured by the Web cam or other camera. The user can then specify with whom from the user's contact list the image or images are to be shared via a dialog box or otherwise as similarly discussed above.

Optionally, the user can also share images or snapshots of Web pages via the file sharing application. For example, the user can open a browser or other Web access application and then click an image capture button. Clicking the image capture button will cause the file sharing application to capture an image of the Web page and open the file sharing dialog box. The user can then select with whom the Web page image will be shared with. The recipients of the image can then click on the Web page image as presented in their file sharing application and their browser will open to that Web page.

Figure 1:
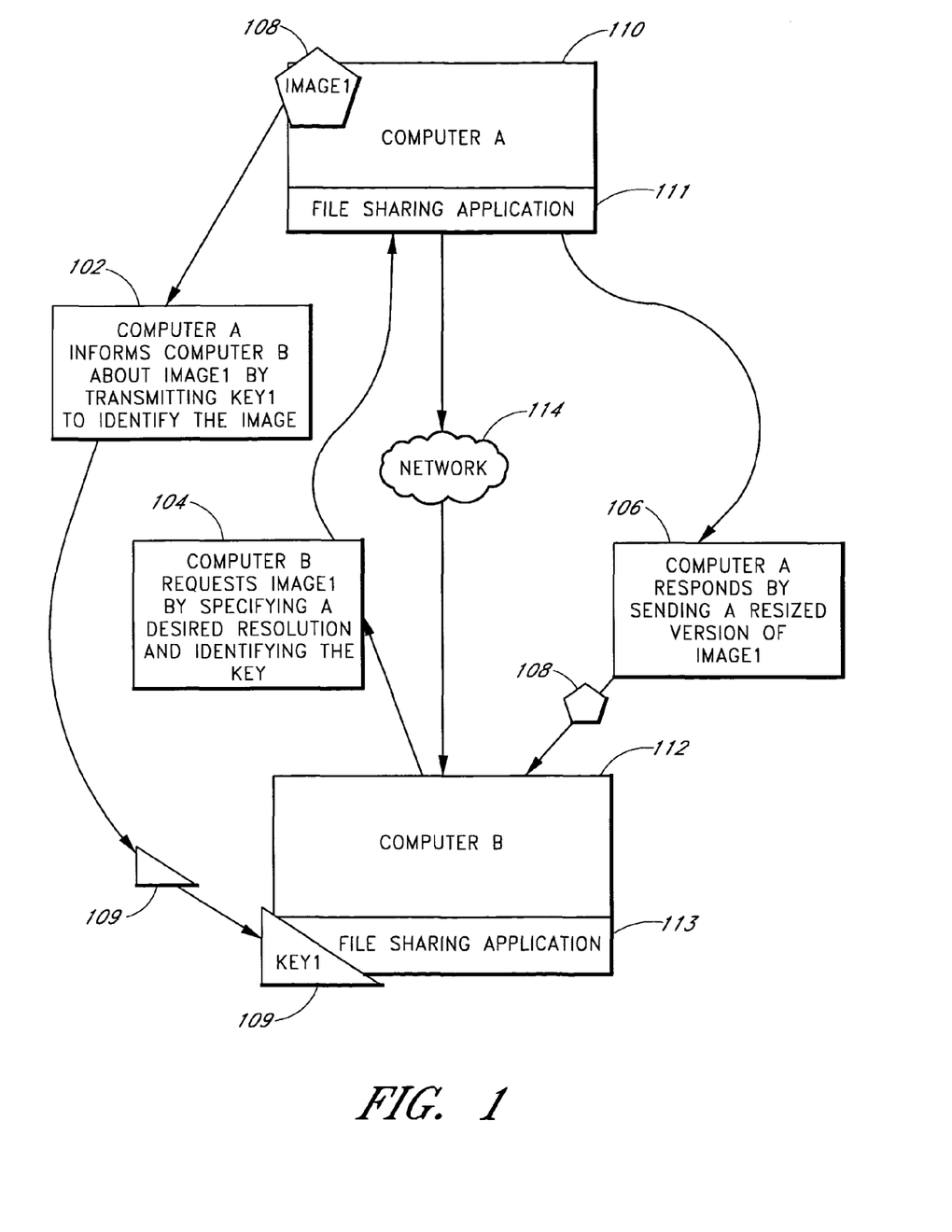
FIG. 1 illustrates an example system architecture and image file access process.

FIG. 1 includes an example networked system and flow diagram of a hybrid push-pull method used to share images. As illustrated in FIG. 1, a peer terminal Computer A 110 is associated with a sending user. The peer terminal Computer A 110 can be, by way of example, a networked desktop computer, server, personal digital assistant, personal video recorder, cellular telephone, image server, or the like, is coupled via a network 114 to a peer terminal Computer B 112 associated with a receiving user. The receiving peer terminal Computer B 112 can be, by way of example, a networked desktop computer, server, personal digital assistant, personal video recorder, cellular telephone, image server, or the like. While, for the purposes of clarity, the peer terminal Computer A 110 is referred to as the sending peer terminal, it can also act as the receiving peer terminal. Similarly, the peer terminal Computer B 112 is referred to as the receiving peer terminal, it can also act as the sending peer terminal. By way of example, the network 114 can include one or more of the Internet, an intranet, a wide area network, and a local area network.

The sending and receiving peer terminals, Computer A 110 and Computer B 112, can each include web browsers, image management applications, file sharing applications 111, 113, network interfaces, email clients, and images, such as pictures. The file sharing applications 111, 113 can be downloaded from a Web site or other computer to Computer A 110 and/or Computer B 112, installed via computer readable removable storage media, come preinstalled on the computers' mass memory, or otherwise loaded. The images or pictures can be stored in local computer memory, or storage devices accessible by the peer terminal over a local network, and so on.

The file sharing applications 111, 113 can also optionally include integrated image management and editing functions, or those functions can be provided by a separate image management application (not shown). For example, the image management and edit functions can include one or more of automatically searching for images stored on the computer's drive and/or over a network, setting up image albums, assigning images to the image albums, assigning titles and/or key words to images, searching for or sorting images based on album titles, picture titles, and/or keywords, and dates. The image management and edit functions can further include one or more of cropping images, reducing red eye, enhancing image color and/or contrast, and so on.

At state 102, the sending terminal Computer A 110, via the file sharing application 111, makes available one, several, or many image files by transmitting or pushing permission data Key1 109 over the network to the receiving peer terminal Computer B 112. The permission data can provide authorization to access images selected by the sending user. The permission data can be in the form of alphanumeric metadata. An illustrative example of permission metadata is as follows:

```
<image iid='-8' uid='4' mid='22' uid2='24'
width='640' height='566'
container='from trogdor' filename='IMG_8063.jpg'
filesize='31904'
md5='5548bf64 607865d0 4c1ba901 3422cb5c'
filemodtime='37903.984109' />
```

The example permission metadata above includes an image identifier (image iid), a user identifier (uid), a machine identifier (mid), a second user identifier (uid), an image width (width), an image height (height), a container or file identifier or hint (container), an image file name (filename), an image file size (filesize), a file content signature (md5), a file modification time (filemodtime). A unique image ID is defined by the combination of the image identifier, the user identifier, and the machine identifier. Other forms of permission data can be used as well. For example, the permission data need not include a container identifier, a file modification time, or other of the above data items. In addition, the unique image identifier can instead be provided with an appropriate length identification code. Further, other data can be included, such as an access code or password. Optionally, the Key1 can have an expiration date and/or a limit on the number of times it can be used to retrieve the corresponding image file or files. By way of example, in an embodiment, the sending terminal or server maintains a count of how many times a given image file had been retrieved, and/or when the file was initially shared, and stores that data in association with the per-user permission data for the file. The sender application can then check the number of times the file has been retrieved by a requesting user, compare that number to the permitted number of retrievals, and determine if that number has been reached, and so whether or not to allow the user to access the file again. Similarly, the expiration date and determine if that date and has passed, and so whether or not to allow the user to access the file.

The receiving peer terminal Computer B 112, remembering and storing Key1 109 and associated permission data in local memory, can use Key1 or a portion thereof, and file sharing application 113 to automatically make one or more requests for the same or different versions of a given image by specifying a size (which, for example, can be expressed as a bounding box) that the remote sender Computer A 110 automatically responds to by transmitting the requested image data to the receiving peer terminal Computer B 112. Alternately or in addition, the receiving peer terminal Computer B 112 can request the binary contents of the original file, which is an operation supported by existing or yet to be developed transfer protocols, such as HTTP (HyperText Transfer Protocol), which is used in moving hypertext files across the Internet.

In this example, at state 104, Computer B 112 requests Image1 108 from Computer A 110 by identifying the requested image using Key1 109 and specifying the desired resolution, such as 96 pixels by 96 pixels for a thumbnail size image, or 640 pixels by 480 pixels for a screen size version of the image. Of course other thumbnail resolutions, such as 64×64 pixels, 128 pixels by 128 pixels, or 160 pixels by 160 pixels. The request is transmitted to Computer A 110. For example, an example request can be in the form of:

1. A global image identifier for the image which can optionally be based on, or include:
   a) a user identifier (such as that received in the permission data for the image) corresponding to the sending user who shared the image
   b) a machine identifier (such as that received in the permission data for the image) corresponding to the machine that will transmit or otherwise share the image
   c) a local image identifier of the image (such as the image identifier received in the permission data for the image), which can be specific to the particular user on the particular machine.

2. The width and height of the bounding box, each expressed as integers, though the size and/or resolution can also be otherwise expressed.

In the example embodiment, because connections are authenticated, implicit in the request is the ID or identifier of the requesting user, which is used at the ACL (access control list) level, discussed below. Therefore, the requesting user identifier is optionally not explicitly included in the image request, and so user spoofing is further inhibited. Optionally, however, the requesting user's identifier can be included in the request, preferably before the request reaches the security layer, which can determine whether it is allowed or not allowed.

Optionally, in one embodiment a user can request a zoom or resizing of a shared image, wherein the user can specify or select a portion of a shared image. The portion can be selected by drawing or defining a border surrounding the desired portion. The image sharing application then issues a request for the zoomed portion using the image identifier information and bounding box information described above, and by further including the following parameters in the request:

Scale
Translate X,
Translate Y

The foregoing parameters specify a transform for a picture or image to be displayed in the above bounding box so the receiving terminal view smaller portions of the picture.

Optionally, Computer B 112 can select a resolution that will fill a predetermined portion or percentage of Computer B's screen. For example, Computer B 112 can request a resolution to fill 60 percent of Computer B's screen or window displayed thereon. The request can be issued automatically by the file sharing application 113 executing on Computer B 112, without requiring the user to manually instruct the file sharing application 113 to issue the request.

At state 106, Computer A 110 optionally automatically resizes the Image1 108 in real time, on the fly, to the requested resolution without requiring the manual intervention of the user of Computer A 110. Computer A 110 then transmits Image1 108 at the desired resolution over the network to Computer B 112, where the image is displayed using the file sharing application 113 and/or using other applications that can be used to view images.

Optionally, at state 102 Computer B 112 can automatically request a given image at two different resolutions. The request can be in the form of a single request transmission requesting both resolutions, or can be in the form of two sequential request transmissions, wherein the first request asks for the image at one resolution, and the next requests ask for the image at a second resolution. The second request transmission is optionally provided substantially immediately after the first request transmission. For example, the two resolutions can be at 96 pixels by 96 pixels (thumbnail sized) and at 640×480 pixels (screen sized). Computer A 110 can then respond to the request in a prioritized fashion by first transferring the lower resolution version, and then transferring the higher resolution version. This ensures that the user of Computer B 112 will be able to view the thumbnail version almost instantly. However, optionally transfer of the higher resolution version can be given the higher priority and the lower resolution version the lower priority. Further, the transmission of the lower and higher resolution versions can be interleaved.

Optionally, the sending file sharing application 111 automatically encrypts images and associated chat text before transmitting them to the recipient to enhance security. The encryption can be performed at a connection or stream level, and/or at a component or file level. By way of example, the application 111 optionally utilizes 128-bit AES encryption. This prevents third party entities, including operators of servers through which the sharing may occur, from viewing the shared images. Further, the file sharing applications 111, 113 optionally include or act as a built-in firewall to prevent unauthorized access to the users' mass memory, such as the hard disk drives of Computer A 110 and Computer B 112. For example, a file-level ACL (access control list) is optionally used to prevent unauthorized access so that file system access is not exposed to a remote client, in contrast to a web server environment wherein file system access is exposed.

Optionally, during logon and chat sessions, the sending user is connected to a log-on server. Once the sending user has sent images to another user or users, the sender is directly connected, without intervention by the log-on server, with the other users for the duration of the sharing session. The session can be terminated, by way of example, in response to a user's manual termination, in response to a user closing the sharing application, or in response to time-out caused by lack of communication activity between the sending user and another corresponding user.

Figure 2A:
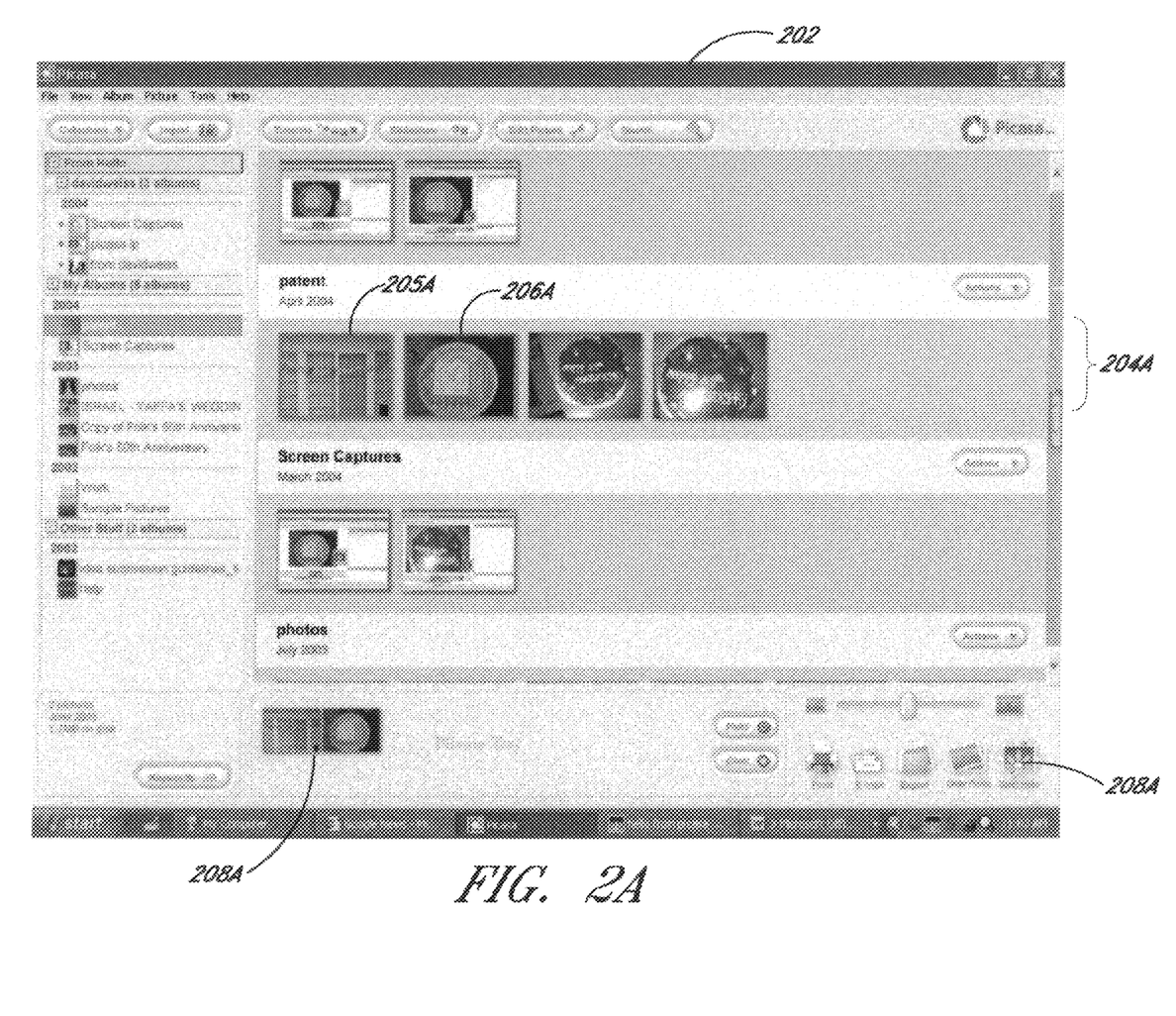
FIGS. 2A-2E illustrate example user interfaces.
Figure 2B:
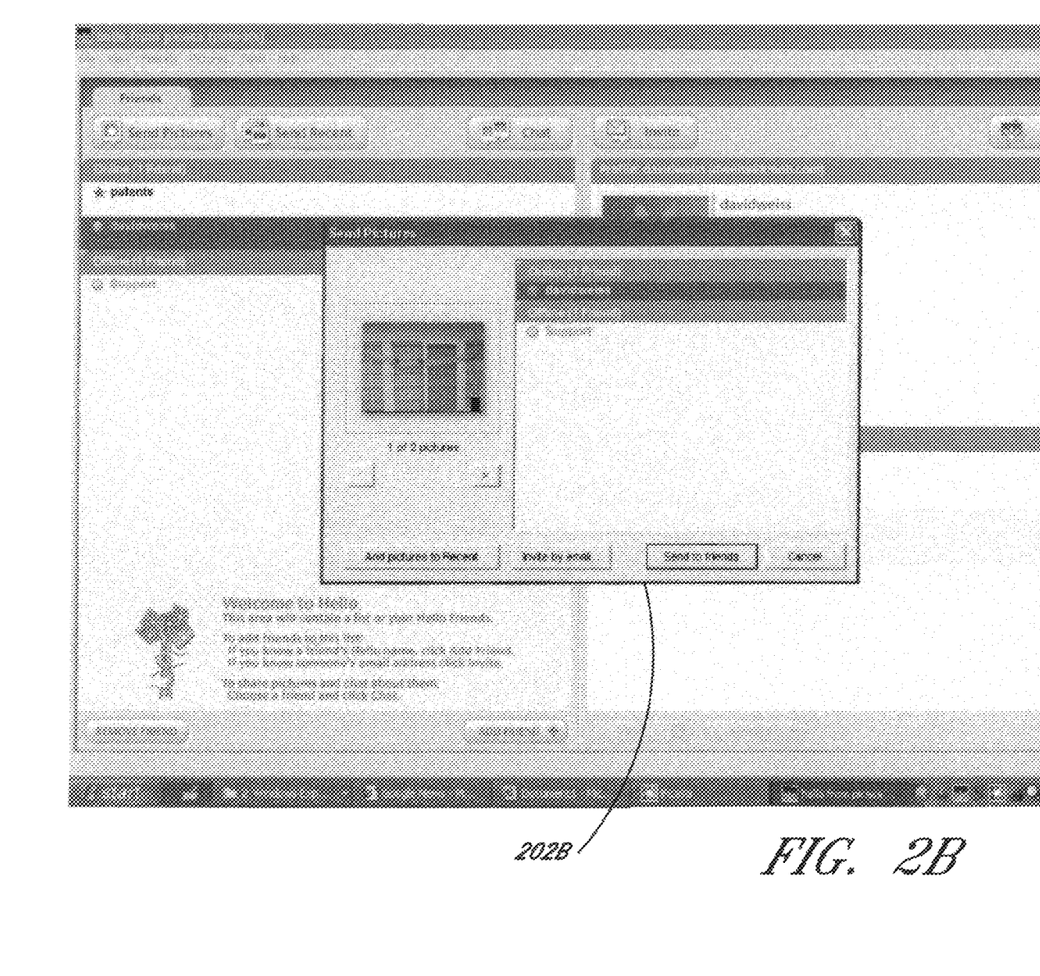

An example embodiment will know be described with reference to FIGS. 2A-B, which illustrate example user interfaces. With reference to FIG. 2A and as similarly described above, a user accesses a file sharing and image management application executing on a computer terminal that displays, via example user interface 202A, the images stored on the user's computer, local network, and so on. The images can include, for example, one or more of digital photographs or videos, graphic files, drawing files, and so on. In this example, the user interface 202A can be accessed directly, or by activating a "send pictures" button 206C, illustrated in FIG. 2C. The user selects the images to be shared with a recipient by clicking on or otherwise selecting the images. For example, a shift+click combination can be used to select multiple sequential pictures at a time. Similarly, a control+click combination can be used to select multiple non-sequential pictures.

In the illustrated example, the user has selected images 205A, 206A from album 204A (titled "patent"). Thumbnail versions of the selected images 205A, 206A appear in a selected images area 208A, which for convenience may be referred to as a picture tray. Optionally, to avoid having a selected picture replace pictures in the group-of images in the picture tray, the user may need to click a "hold" button or the like before selecting a new image to be added to the picture tray.

If the user activates the "send" button 208A the user is asked to designate the recipient(s) by clicking on a recipient identifier in a contacts, friends, or buddy list presented to the user. FIG. 2B illustrates an example recipient selector form 202B. Once the recipient is selected, the file sharing applications on the sender's and recipient's terminals perform the example process discussed above with reference to FIG. 1, wherein the sending terminal first sends the permission data to the receiving terminal, which then requests the desired version of the image at the desired resolution using the permission data.

Figure 2C:
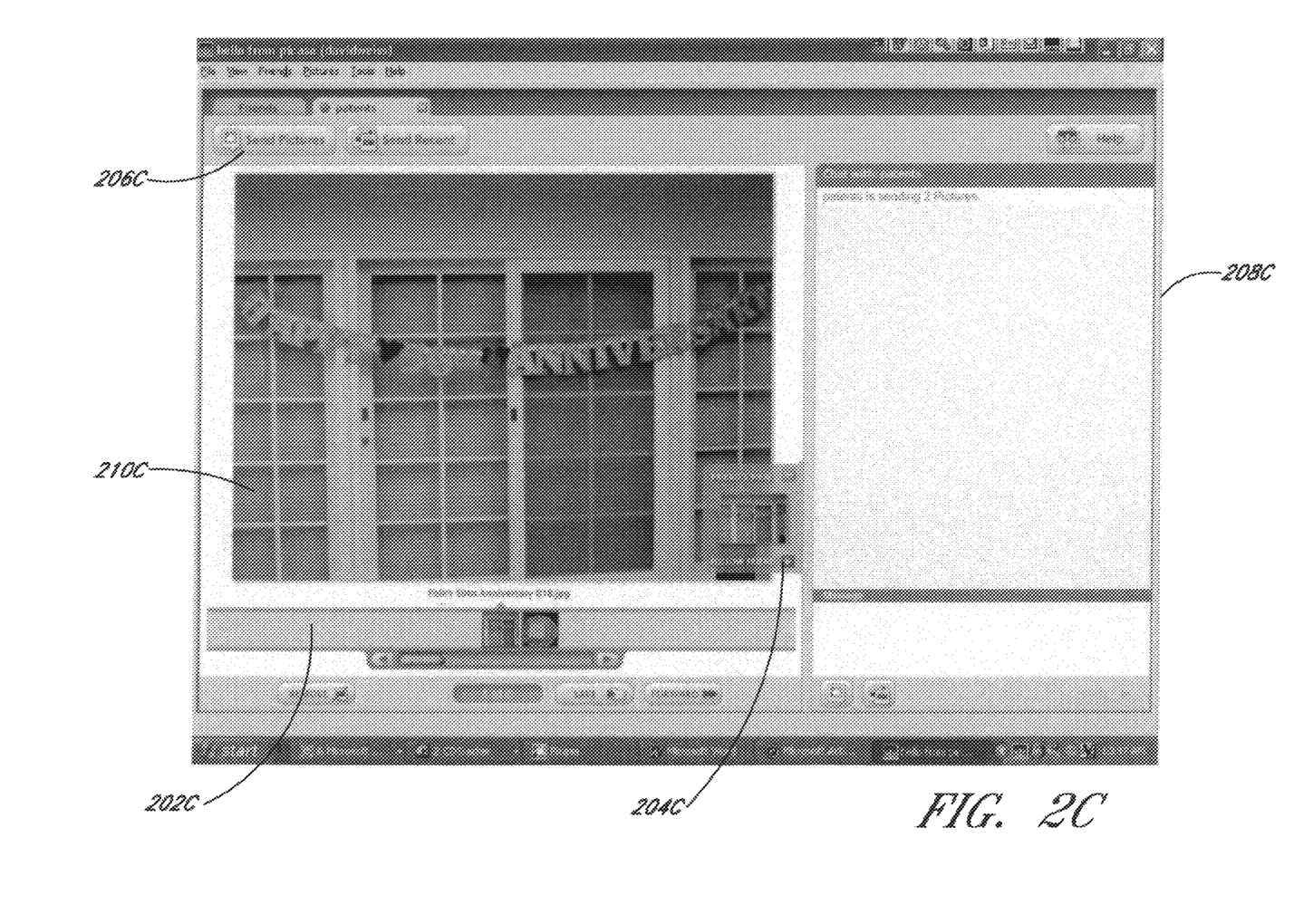

FIG. 2C illustrates an example interface that can be used to share and discuss images, such as pictures. An image area 202C, sometimes referred to as a filmstrip, includes small versions, such as thumbnail versions, of the two example selected and shared images 205A, 206A previously discussed with reference to FIG. 2B. A larger, higher resolution version of one of the selected images is displayed in area 210C, allowing the user to better view the image. A friend's view window 204C depicts what image a selected other user, such as the recipient, is viewing. A send pictures button 206C can be used to initiate the sending of the permission data to the selected recipient, as similarly discussed above. A chat area 208C is provided to allow the sender and recipient to chat while sharing photos or other images or files. The chat process and apparatus are discussed in greater detail in copending application, titled "Networked Chat and Media Sharing Systems and Methods" Ser. No. 10/847,194, the contents of which are incorporated by reference herein in their entirety. An area is optionally provided on the sender's and recipient's file sharing interfaces which displays pictures recently sent or received.

As similarly discussed above, the sending user's file sharing application then automatically generates the permission data corresponding to the selected images and transmits or pushes the permission data over a network to the selected recipient's terminal. The recipient's file sharing application then automatically requests low resolution thumbnail versions, and optionally, preview resolution versions of the images from the sending user's file sharing application, wherein the request includes an image identifier. By way of example and not limitation, the preview resolution can be five, ten, twenty, or fifty or more times the resolution of the thumbnail resolution. The sending user's file sharing application automatically generates or retrieves low resolution, and optionally preview versions of the selected images and sends the low resolution and preview versions to the selected recipient via the file sharing application executing on the recipient's computer terminal. Because the transmitted images are of low resolution, the transmission occurs in almost real time and appear on the recipient's terminal display substantially instantly, such as in less than one second or in under five or ten seconds. Further, the handshaking between the two terminals is transparent to the sending and receiving users.

Figure 2D:
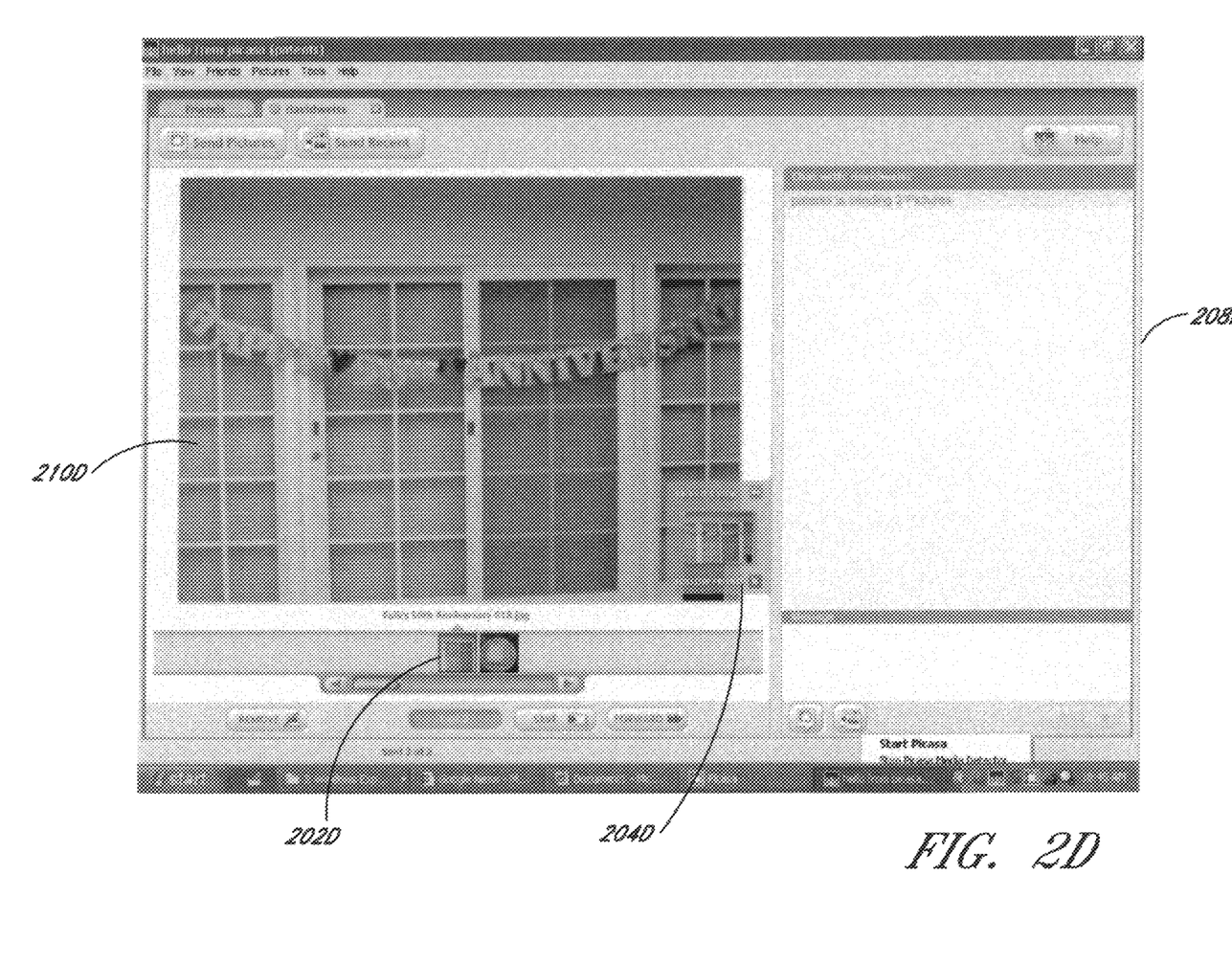

As illustrated in FIG. 2D, the file recipient's sharing application will display one or more of the low resolution images in a film strip area 202D. If the recipient's sharing application is open, the low resolution images will be displayed almost instantly. The larger, higher resolution preview version of one of the received images is displayed in area 210C. The preview versions of the other thumbnail images are optionally stored locally in the recipient's user terminal memory, and can be instantly displayed in area 210C upon being select by the recipient. As with the sending user's file sharing application, the recipient's sharing application can have a friend's view window 204D, a Send Pictures button 206D and a chat area 208D.

The recipient can optionally click on or otherwise select one or more of the received low resolution images. The recipient's file sharing application then automatically requests a higher resolution version of the selected images to the sending user's file sharing application, if such has not already been transferred to the receiving terminal. The sending user's file sharing application then retrieves or generates the requested higher resolution version of the images and transmits them to the recipient's file sharing application. The higher resolution image is then displayed via the recipient's file sharing application in area 210B. When a recipient receives pictures they can optionally be automatically displayed in the recipient's image management application.

Figure 2E:
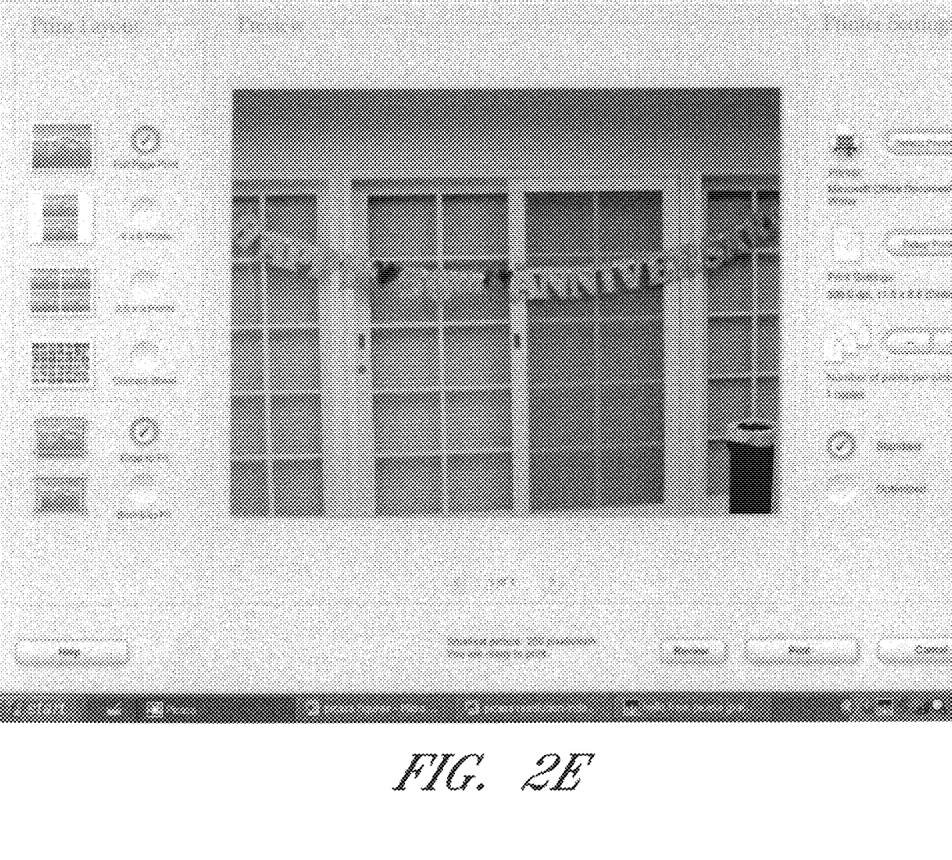

Optionally, the recipient can select one or more of the received images, such as the higher resolution preview versions of the images, by clicking on the desired image, printing the desired image, and/or saving the desired image. If the user elects to print an image, a print form, an example of which is illustrated in FIG. 2E, is presented to the user. The recipient's file sharing application then automatically requests a still higher or full resolution version of the selected images to the sending user's file sharing application. The sending user's file sharing application then corresponding generates or retrieves the requested still higher or full resolution version of the images and transmits them to the recipient's file sharing application for viewing, editing, and/or storing by the recipient in accordance with the sending user's permissions.

The apparatus and processes described above differ from conventional picture sharing Web sites. For example, on such conventional picture sharing Web sites, after the user picks the images to be uploaded, and resizes the images for uploading, it can still take hours to upload a gallery of many images, which can total many hundreds of megabits or more in size. Further, the user often does not know when or if someone has viewed the uploaded images. By contrast, as described above, using an embodiment of the present invention relatively lower resolution versions of the images being shared optionally are sent to and arrive on the computers and screens of the designated recipients in substantially real time, without requiring the inconvenience of the sender uploading the pictures to a public website and users then downloading those images.

An optional embodiment overcomes certain hindrances in communicating images over a network. For general use, many applications use the TCP/IP protocol. However, in the presence of a "NAT" or Network Address Translator (which is in common use among consumers to allow multiple computers to share an Internet IP address), such TCP connections are blocked between two peers. Conventionally, a TCP connection can only be established if at least one of the hosts is not behind a NAT.

Optionally, in an example embodiment a protocol is built on top of the knowledge that with the help of a third-party host, UDP packets can be passed directly between two hosts behind different NATs. In particular, UDP does not provide guaranteed delivery—packets may be lost and not recovered. After adding reliability features to provide the features of TCP/IP, the following two operations between two NAT'd machines can be performed:

Transfer image files and other media assets

Implement the hybrid push-pull model discussed above by maintaining a persistent open connection.

A significant portion of computer network traffic relies on the availability of a reliable, connection-oriented protocol for the transmission of data between computers (corresponding to level 4 of the OSI model). Without such a protocol, many software applications which utilize computer networks and the Internet in particular could not properly function. There are several protocols available to software designers for creating these reliable connections, including the Transmission Control Protocol (TCP).

As network security has become more important, TCP has begun to show some limitations. In particular, widely used TCP implementations conventionally need one endpoint to "listen" on a known address, and accept incoming connections from any computer. Because this can result in a security risk, many computers are firewalled to prevent such incoming connections. In addition, due to the scarcity of addresses on the Internet, many firewalls also employ an address translation mechanism which makes it difficult or impossible for a computer to convey its listening address to potential peers. As a result, many computers on the Internet have become isolated from each other, requiring an intermediary for communication. Such intermediaries are often expensive in terms of bandwidth utilization, are sometimes unavailable, and may introduce additional security problems.

To overcome these problems, a class of protocol has been developed that can be used as a qualitatively equivalent substitute for TCP in cases where two peers wish to establish a reliable connection. Software which utilizes such a protocol can then be used in situations where TCP cannot and with minimal or minor changes when TCP support already exists. For purposes of convenience, this protocol is referred to herein as a Directed Connection Protocol (DCP). DCP utilizes another network protocol known as UDP (User Datagram Protocol). UDP is widely supported by the Internet infrastructure, but often does not conventionally support a connected model, or the desired degree of reliability. However, it is a property of many firewall and network translation implementations that when UDP traffic is directed out to a particular address, replies from that address are able to pass the firewall or translation barrier. DCP utilizes these properties to overcome certain limitations of TCP.

Figure 3:
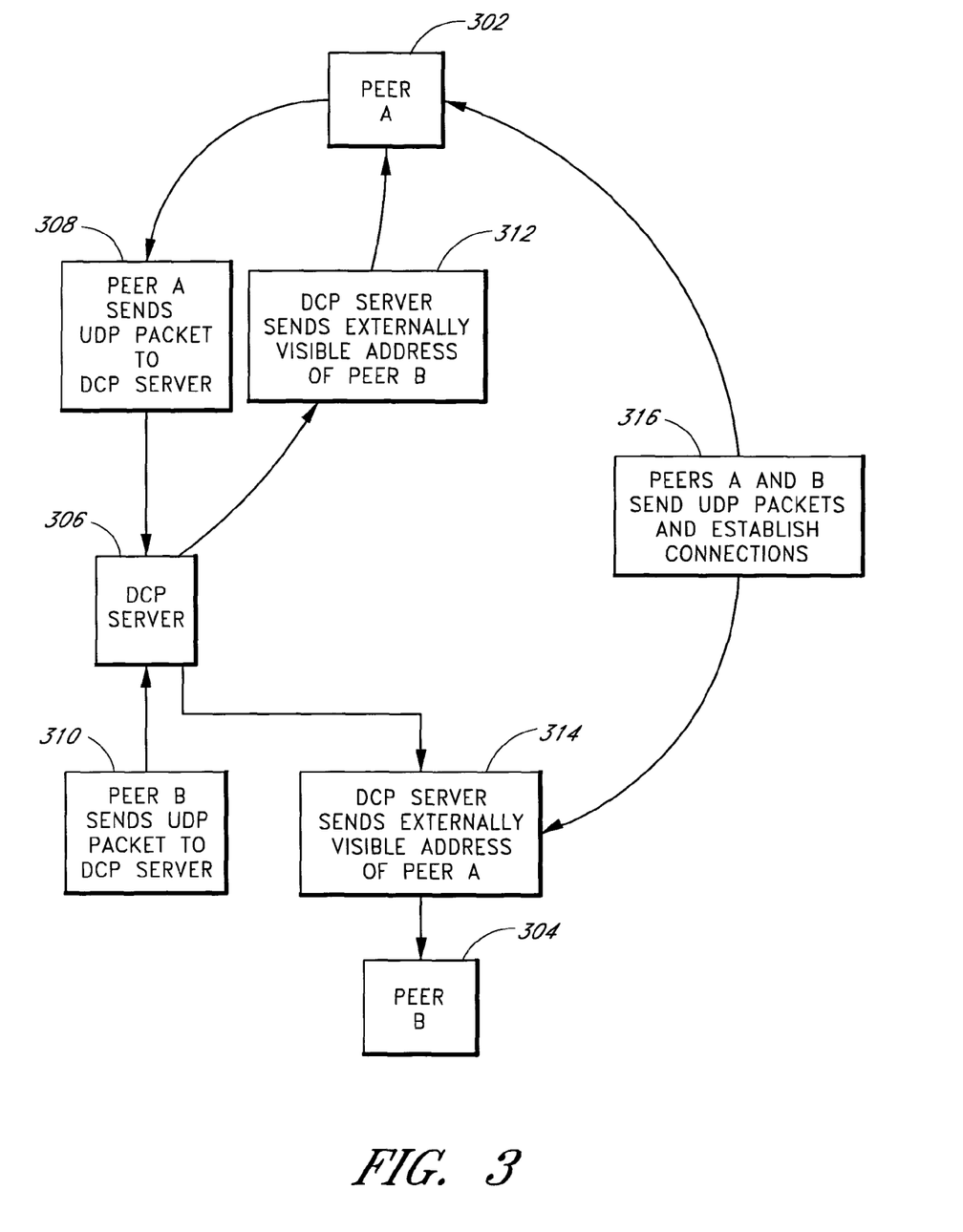
FIG. 3 illustrates an example system architecture and peer-to-peer connection process using an enhanced connection protocol.

With reference to FIG. 3, when two peer terminals 302, 304 wish to connect to each other using DCP, they send UDP packets at states 308, 310 to a DCP server 306 which is unfirewalled to both peers 302, 304. The DCP server 306 matches these connection requests to each other, and at states 312, 314 replies to each peer 302, 304 with the externally visible address of the other peer. At state 316, the peers then send UDP packets to each other, using these external addresses. Once these packets arrive, the peer terminals 302, 304 perform a handshake which establishes the connection. The peers 302, 304 can then exchange data without an intermediary. DCP optionally incorporates sequencing and retransmission of packets at all stages, to provide a reliable data stream.

The properties of UDP involving its interaction with firewalls and network translators, as well as the ability to create a connected, reliable protocol using UDP as a base, protocol is known. However, these techniques are not conventionally used to request image files of dynamically generated size and resolution. Further, the techniques and processes described herein for connecting computer systems across the Internet enables a much higher and more efficient utilization of the existing Internet infrastructure than many conventional protocols allow.

To ensure available, DCP servers may be deployed by a variety of entities, which may not be known or trusted by peers wishing to connect. However, a trusted relationship with the DCP server is not necessary to establish a secure connection between peers. For example, the peers may exchange a security key before attempting to connection. This exchange may be facilitated by a third party who is trusted by both peers. This third party will often exist as the impetus for establishing the peer connection, arid may also select the DCP server to be used for connection. Once both peers share a security key, it can be used in some form of challenge-response authentication, which prevents a broken or hostile DCP server from connecting one peer to an incorrect second peer, which may also be hostile.

While the foregoing has described what are considered to be the best mode and/or other illustrative embodiments, it is understood that various modifications may be made therein and that the invention or inventions may be implemented in various forms and embodiments, and that they may be applied in numerous applications, only some of which have been described herein. For example, the push-pull method could be used with any of a variety of large files, and is not restricted to image files. For example, some other files may include text files, audio files (e.g., "wav" files), audiovisual files (e.g., "mpeg" files), and so on.

What is claimed is:

1. A method of peer-to-peer sharing of images over a network, the method comprising:

receiving a selection of a first image by a user of a sending peer terminal, wherein the first image has a first resolution;

transmitting over a network permission data for the selected first image from the sending peer terminal to a receiving peer terminal, the permission data including at least:

image identification information, and resolution information, the resolution information specifying only a second resolution less than the first resolution;

automatically transmitting an image request for the first image from the receiving peer terminal to the sending peer terminal, wherein the image request is for the first image in the second resolution; and in response to receiving the image request, the sending peer terminal:

scaling the first image to the second resolution, encrypting the scaled first image, and transmitting the encrypted first image at the second resolution over the network to the receiving peer terminal.

2. The method as defined in claim 1, wherein the permission data includes:

a user identifier;

a machine identifier;

an image width;

and an image height.

3. The method as defined in claim 1, wherein the permission data includes:

a container identifier;

an image file size;

a file content signature;

and a file modification time.

4. The method as defined in claim 1, wherein the image request includes a requested image identifier based at least in part on:
a user identifier;
a machine identifier;
and a local image identifier.

5. The method as defined in claim 1, wherein the image request specifies the second resolution.

6. The method as defined in claim 1, wherein the image request specifies the second resolution as a bounding box.

7. The method as defined in claim 1, wherein the second resolution corresponds to a thumbnail sized image.

8. The method as defined in claim 1, wherein the permission data is transmitted in response to the user of the sending terminal providing a send picture command.

9. The method as defined in claim 1, further comprising, in response to at least one image request from the receiving peer terminal, the sending peer terminal:
automatically scaling the first image to a third resolution, the third resolution greater than the second resolution and less than the first resolution;
encrypting the first image at the third resolution;
transmitting the encrypted first image at the third resolution to the receiving peer terminal.

10. The method as defined in claim 9, further comprising assigning a higher priority to transmitting the first image at the second resolution than to transmitting the first image at the third resolution.

11. The method as defined in claim 9, further comprising:
issuing a request from the receiving peer terminal to the sending peer terminal for the first image at the first resolution at least partly in response to detecting that the user of the receiving peer terminal is initiating at least one of a save operation and a print operation;
and transmitting from the sending peer terminal to the receiving peer terminal the first image at the first resolution.

12. The method as defined in claim 1, further comprising:
receiving from the sending user a specification on a maximum sharing resolution;
comparing the maximum sharing resolution to a requested image resolution for a second image;
and transmitting the second image at a resolution equal to the smaller of the image requested image resolution for the second image and the specified maximum sharing resolution.

13. The method as defined in claim 1, wherein the sending peer terminal is one of a desktop computer, personal digital assistant, personal video recorder, and cellular telephone.

14. The method as defined in claim 1, wherein the scaled first image is encrypted on a connection level.

15. The method as defined in claim 1, wherein the scaled first image is encrypted on a component level.

16. The method as defined in claim 1, further comprising:
receiving a selection of a plurality of pictures by the user of the sending terminal;
receiving a send picture command from the user of the sending terminal;
causing a list of potential recipients to be displayed to the user of the sending terminal;
receiving a selection of a first recipient;
transmitting second permission data to a terminal associated with the first recipient, the second permission data authorizing access to the plurality of pictures;
receiving at the sending terminal a second image request automatically generated by the terminal associated with the first recipient in response to receiving the permission data, the second image request identifying the plurality of pictures and first and second requested resolutions for the plurality of pictures;
transmitting from the sending terminal to the terminal associated with the first recipient the plurality of pictures at both the first and second requested resolutions;
automatically displaying the plurality of pictures at the first resolution on the terminal associated with the first recipient;
storing at least a portion of the plurality of pictures at the second resolution on the terminal associated with the first recipient;
and in response to the first recipient selecting at least one of plurality of pictures displayed at the first resolution, displaying the at least one of the on the plurality of pictures at the second resolution on the terminal associated with the first recipient.

17. The method as defined in claim 16, wherein the second image request includes a plurality of request transmissions corresponding to the plurality of pictures.

18. The method as defined in claim 1, further comprising:
the sending terminal and receiving terminals transmitting UDP packets to a server;
the server transmitting an address of the sending terminal to the receiving terminal;
the server transmitting an address of the receiving terminal to the sending terminal;
and the sending and receiving terminals establishing a connection utilizing the receiving and sending terminal addresses.

19. The method as defined in claim 18, wherein the sending terminal and receiving terminal have firewalls.

20. A peer-to-peer image sharing application for sharing images between users, the peer-to-peer image sharing application comprising instructions stored in computer readable memory configured to:
receive a selection of a plurality of images by a first user of a first terminal, wherein each of the plurality of images has a first resolution;
receive a send image command from the first user;
cause a list of potential recipients to be displayed to the first user;
receive a selection of at least a first recipient from the list of potential recipients from the first user;
transmit permission data for the plurality of images to a terminal associated with the first recipient, the permission data including at least resolution information specifying only a second resolution less than the first resolution and an expiration time that determines whether to allow retrieval of the selection of the plurality of images;
receive at the first terminal a request from the terminal associated with the first recipient in response to the terminal associated with the first recipient receiving the permission data, the request is for the plurality of images in the second resolution;
and transmit by the first terminal to the terminal associated with the first recipient the plurality of images at the second resolution so that the plurality of images appear on a display of the terminal associated with the first recipient substantially instantly.

21. The method as defined in claim 20, wherein the request identifies each of the plurality of image with a corresponding image identifier based at least in part on:
a user identifier associated with the first user;
a machine identifier associated with the first terminal;
and a local image identifier.

22. The peer-to-peer image sharing application as defined in claim 20, wherein the request includes a separate request for each of the plurality of images.

23. The peer-to-peer image sharing application as defined in claim 20, wherein the request further identifies a second requested resolution higher than the first resolution for the plurality of images, and wherein the instructions are further configured to transmit to the terminal associated with the first recipient the plurality of images at the second requested resolution.

24. The peer-to-peer image sharing application as defined in claim 22, wherein the instructions are further configured to transmit to the terminal associated with the first recipient the plurality of images at the second requested resolution at a lower priority than the plurality of images at the first requested resolution.

25. The peer-to-peer image sharing application as defined in claim 22, wherein the instructions are further configured to encrypt the plurality of images for transmission to the terminal associated with the first recipient.

26. The peer-to-peer image sharing application as defined in claim 20, wherein the permission data includes at least:
image identification information;
and resolution information.

27. The peer-to-peer image sharing application as defined in claim 20, wherein the resolution information includes the height and width of the plurality of images in terms of pixels.

28. The peer-to-peer image sharing application as defined in claim 20, wherein the permission data includes at least:
an image identifier;
a user identifier;
and a machine identifier.

29. The peer-to-peer image sharing application as defined in claim 20, wherein the permission data includes at least:
an image file size;
a file content signature;
and a file modification time.

30. The peer-to-peer image sharing application as defined in claim 20, wherein the instructions are further configured to size the plurality of images at the first requested resolution in response to the request.

31. The peer-to-peer image sharing application as defined in claim 20, wherein the first requested resolution is no greater than 160 pixels in a first dimension.

32. A peer-to-peer image sharing program for sharing images between users, the peer-to-peer image sharing program comprising instructions stored in computer readable memory configured to:
receive permission data for an image stored on a sending user's terminal, wherein the image has a first resolution, and the permission data including at least resolution information specifying only a second resolution less than the first resolution and an expiration time that determines whether to allow retrieval of the image;
at least partly in response to receiving the permission data, automatically transmit from a first terminal a request for the image to the sending user's terminal, the request specifying the image in the second resolution;
receive at the first terminal the image at the second resolution from the sending user's terminal;
and cause the image to be displayed at the second resolution on a first terminal display.

33. The peer-to-peer image sharing application as defined in claim 32 wherein the image is received in an encrypted form and the instructions are further configured to decrypt the encrypted image.

34. The peer-to-peer image sharing application as defined in claim 32, wherein the request further identifies a second requested image resolution higher than the first requested image resolution.

35. The peer-to-peer image sharing application as defined in claim 32, wherein the request for the image identifies the image based at least in part on:
a user identifier associated with the sending user;
a machine identifier associated with the sending user's terminal;
and a local image identifier.

36. The peer-to-peer image sharing application as defined in claim 33 wherein the instructions are further configured to:
receive and store the image at the second requested image resolution;
and cause the image at the second requested image resolution to be displayed by the first terminal at least partly in response to a user of the first terminal selecting the image displayed at the first resolution.

37. The peer-to-peer image sharing application as defined in claim 32, wherein the permission data includes at least:
image identification information;
and resolution information.

38. The peer-to-peer image sharing application as defined in claim 32, wherein the permission data includes at least:
an image identifier;
a user identifier;
and a machine identifier.

39. The peer-to-peer image sharing application as defined in claim 32, wherein the permission data includes at least:
an image file size;
a file content signature;
and a file modification time.

40. The peer-to-peer image sharing application as defined in claim 32, wherein the first requested image resolution is no greater than 160 pixels in a first dimension.

41. A method of peer-to-peer sharing of images, the method comprising:
receiving a selection of a first image by a first user of a first terminal, wherein the first image has a first resolution;
receiving a recipient selection by the first user;
transmitting metadata for the first image from the first terminal to a second terminal associated with a second user, the metadata including resolution information specifying only a second resolution less than the first resolution and an expiration time that determines whether to allow retrieval of the first image;
at least partly in response to receiving the metadata, the second terminal automatically transmitting a request for the first image at a second resolution to the first terminal;
and in response to the request, the first terminal automatically transmitting the first image at the requested second resolution to the second terminal.

42. The method as defined in claim 41, wherein the request for the first image identifies the first image based at least in part on:
a user identifier associated with the first user;
a machine identifier associated with the first terminal;
and a local image identifier.

43. The method as defined in claim 41, further comprising:
receiving a second request for the first image from a second terminal user;
determining if the second terminal user has met a request limit;
and if the user has met the request limit, denying the second terminal user access to the first image.

44. The method as defined in claim 41, wherein the metadata includes at least:
a user identifier;
a machine identifier;
an image width;
and an image height.

45. The method as defined in claim 41, wherein the metadata includes at least:
a container identifier;
and an image file size.

46. The method as defined in claim 41, wherein the metadata includes at least:
a file content signature;
and a file modification time.

47. The method as defined in claim 41, wherein, in response to the request from the second terminal, the first terminal automatically scales the first image to the first resolution.

48. The method as defined in claim 41, wherein, in response to the request from the second terminal, the first terminal automatically:
encrypts the first image at the first resolution;
and transmits the encrypted first image at the first resolution to the second terminal.

49. The method as defined in claim 41, wherein the request specifies a second resolution for the first image, wherein the second resolution is greater than the first resolution.

50. The method as defined in claim 49, further comprising assigning a higher priority to transmitting the first image at the first resolution than to transmitting the first image at the second resolution.

51. The method as defined in claim 41, wherein the request specifies a second resolution for the first image, wherein the second resolution is specified as a bounding box.

52. The method as defined in claim 41, wherein the request specifies a second resolution for the first image that is at least ten times the first resolution.

53. The method as defined in claim 41, wherein the metadata is transmitted in response to the first user providing a send picture command.

54. The method as defined in claim 41, further comprising:
determining that the second user is initiating at least one of a save operation and a print operation;
automatically issuing a request from the second terminal to the first terminal for the first image at a second resolution at least partly in response to determining that the second user is initiating at least one of a save operation and a print operation, wherein the second resolution is greater than the first resolution;
and transmitting from the first terminal to the second terminal the first image at the second resolution.

55. The method as defined in claim 41, further comprising:
receiving from the first user a specification on a maximum sharing resolution, comparing the maximum sharing resolution to a requested image resolution for a second image from a second user;
and transmitting the second image to the second user at a resolution substantially equal to the smaller of the specified maximum sharing resolution and the requested image resolution for the second image.

56. The method as defined in claim 41, further comprising:
the first and second terminals transmitting UDP packets to a server;
the server transmitting an address of the first terminal to the second terminal;
the server transmitting an address of the second terminal to the first terminal;
and the first and second terminals establishing a connection utilizing the first and second terminal addresses.

57. The method as defined in claim 56, wherein the first and second terminals have firewalls.

58. A method of peer-to-peer sharing of images, the method comprising:
receiving permission data for a first image from a first terminal, wherein the first image has a first resolution and the permission data including an identifier for the first image, resolution information specifying only a second resolution less than the first resolution, and an expiration time that determines whether to allow retrieval of the first image;
at least partly in response to receiving the permission data, automatically transmitting at least a first request for the first image at a second resolution to the first terminal, the at least first request including the first image identifier and user identification;
receiving the first image at the requested second resolution;
and automatically causing the first image to be displayed to a receiving user.

59. The method as defined in claim 58, wherein the permission data includes at least:
a user identifier;
a machine identifier:
an image width;
and an image height.

60. The method as defined in claim 58, wherein the permission data includes at least:
a container identifier;
and an image file size.

61. The method as defined in claim 58, wherein the permission data includes at least:
a file content signature;
and a file modification time.

62. The method as defined in claim 58, wherein, in response to the at least first request, the first terminal automatically scales the first image to the first resolution.

63. The method as defined in claim 58, wherein, in response to the at least first request, the first terminal:
encrypts the first image at the first resolution;
and transmits the encrypted first image at the first resolution.

64. The method as defined in claim 58, wherein the at least first request specifies a second resolution for the first image, wherein the second resolution is greater than the first resolution.

65. The method as defined in claim 64, wherein the first terminal assigns a higher priority to transmitting the first image at the first resolution than to transmitting the first image at the second resolution.

66. The method as defined in claim 58, wherein the first resolution corresponds to a thumbnail version of the first image, and the at least first request specifies a second resolution for the first image that is at least ten times the first resolution.

67. The method as defined in claim 58, wherein the permission data is transmitted from the first terminal in response to the first terminal user providing a send picture command.

68. The method as defined in claim 58, further comprising:
determining that a user of a receiving terminal is initiating at least one of a save operation and a print operation for the first image;
and automatically issuing a request to the first terminal for the first image at a second resolution at least partly in response to determining that the second user is initiating at least one of a save operation and a print operation, wherein the second resolution is greater than the first resolution.

69. The method as defined in claim 58, further comprising:
transmitting a UDP packet to a server;
receiving an address of the first terminal from the server;
establishing a connection with the first terminal utilizing the first terminal address.

70. The method as defined in claim 69, wherein the first terminal has a firewall.

71. A method of sharing of images, the method comprising:
receiving a selection of a first image by a user of a sending terminal, wherein the first image has a first resolution;
transmitting permission data for the selected first image from the sending terminal to a receiving terminal, the permission data including at least image identification information, and resolution information specifying only a second resolution less than the first resolution;
receiving at the sending terminal an image request from the receiving peer terminal in response to the receiving peer terminal receiving the permission data, wherein the request is for the first image in the second resolution that is lower than the first resolution;
and scaling first image to the second resolution and transmitting the scaled first image to the receiving terminal in response to receiving the image request.

72. The method as defined in claim 71, wherein the permission data includes at least:
a user identifier;
a machine identifier;
an image width;
and an image height.

73. The method as defined in claim 71, wherein the permission data includes at least:
a container identifier;
and an image file size.

74. The method as defined in claim 71, wherein the permission data includes at least:
a file content signature;
and a file modification time.

75. The method as defined in claim 71, further comprising transmitting the first image at a third resolution higher than the second resolution, wherein the sending terminal assigns a higher priority to transmitting the first image at the second resolution than to transmitting the first image at the third resolution.

76. The method as defined in claim 71, wherein the second resolution corresponds to a thumbnail version of the first image.

77. The method as defined in claim 71, wherein the permission data is transmitted from the sending terminal in response to a sending terminal user providing a send picture command.

78. The method as defined in claim 71, further comprising:
transmitting a UDP packet to a server;
receiving an address of the receiving terminal from the server;
establishing a connection with the receiving terminal utilizing the receiving terminal address.

79. The method as defined in claim 78, wherein the receiving terminal has a firewall.

80. The method as defined in claim 71, further comprising:
receiving a zoom request for the first image from the receiving peer terminal, the request including scale and translation specifications;
selecting a portion of the first image based at least in part on the zoom request;
and transmitting the selected portion to the receiving peer terminal.

* * * * *